(12) United States Patent
Acuna, Sr. et al.

(10) Patent No.: US 7,398,770 B2
(45) Date of Patent: Jul. 15, 2008

(54) DUAL COLD AIR INDUCTION SYSTEM, APPARATUS AND METHOD FOR DIESEL ENGINES

(76) Inventors: Henry T. Acuna, Sr., 108 Poquito Dr., Rockport, TX (US) 78382; Henry Acuna, Jr., 108 Poquito Dr., Rockport, TX (US) 78382

( * ) Notice: Subject to any disclaimer, the term of this patent is extended or adjusted under 35 U.S.C. 154(b) by 0 days.

(21) Appl. No.: 11/282,130

(22) Filed: Nov. 18, 2005

(65) Prior Publication Data

US 2006/0272622 A1 Dec. 7, 2006

Related U.S. Application Data

(63) Continuation-in-part of application No. 11/144,981, filed on Jun. 3, 2005, now abandoned.

(51) Int. Cl.
*F02M 31/20* (2006.01)
(52) U.S. Cl. ...................... 123/542; 123/563; 123/41.19
(58) Field of Classification Search ................. 123/542, 123/563, 41.19
See application file for complete search history.

(56) References Cited

U.S. PATENT DOCUMENTS

| | | | | |
|---|---|---|---|---|
| 2,120,779 | A | * | 6/1938 | Ericson |
| 3,441,011 | A | * | 4/1969 | Karl ............................ 123/542 |
| 4,683,725 | A | * | 8/1987 | Sugiura ....................... 123/542 |
| 5,435,289 | A | * | 7/1995 | Pendlebury et al. ......... 123/563 |
| 5,871,001 | A | * | 2/1999 | Pelkey |
| 6,006,540 | A | * | 12/1999 | Coletti ....................... 62/323.1 |
| 6,024,074 | A | * | 2/2000 | Koethe |
| 6,173,578 | B1 | * | 1/2001 | Al-Otaibi .................. 123/41.19 |
| 6,394,076 | B1 | * | 5/2002 | Hudelson ..................... 123/542 |
| 6,561,169 | B2 | * | 5/2003 | Sealy et al. .................. 123/563 |
| 6,736,118 | B1 | * | 5/2004 | Velke |
| 6,758,193 | B1 | * | 7/2004 | Kincaid |
| 6,796,134 | B1 | * | 9/2004 | Bucknell et al. ........... 62/323.1 |
| 2003/0049139 | A1 | * | 3/2003 | Coney et al. ................. 417/243 |
| 2004/0250800 | A1 | * | 12/2004 | Nechvatal .................... 123/563 |
| 2006/0037590 | A1 | * | 2/2006 | Uzkan et al. ................ 123/563 |

* cited by examiner

*Primary Examiner*—Erick Solis
(74) *Attorney, Agent, or Firm*—Henry T. Acuña, Sr.; Rebecca C. Acuña

(57) ABSTRACT

A dual cold air induction ("DCAI") system, apparatus and method for decreasing the intake air temperature, which increases the air's volume and efficiency, at the diesel internal combustion engine's point-of-ignition. The DCAI system comprises a dual air cooling unit defined by primary and secondary compartments. The primary compartment ingests ambient air and conditions it to a preset predetermined temperature for mixing with ambient air upstream of the turbocharger's compressor side. The conditioned ambient air, located on the turbocharger's compressor's downstream side, is further conditioned in the secondary compartment to a preset predetermined temperature which is then delivered to the engine intake. The housing, which houses a plurality of air cooling components for producing cold air, has insulative capabilities for maintaining the cold air temperature created within both compartments of the housing. An expansion valve and an expansion block valve are provided for regulating the refrigerant's flow into both compartments.

86 Claims, 5 Drawing Sheets

DUAL COLD AIR INDUCTION SYSTEM, APPARATUS AND METHOD FOR DIESEL ENGINES

CROSS-REFERENCE TO RELATED APPLICATIONS

This application is a continuation-in-part of prior U.S. application Ser. No. 11/144,981, entitled "COLD AIR INDUCTION SYSTEM, APPARATUS AND METHOD", filed on Jun. 3, 2005 now abandoned.

STATEMENT OF FEDERALLY SPONSORED RESEARCH/DEVELOPMENT

Not applicable.

REFERENCES TO SEQUENCE LISTING

Not applicable.

THE NAMES OF THE PARTIES TO A JOINT RESEARCH AGREEMENT

Not applicable.

REFERENCES TO A SEQUENCE LISTING

Not applicable.

BACKGROUND OF THE INVENTION

The present invention relates generally to improving performance of diesel internal combustion engines.

The efficiency of the diesel internal combustion engine is affected by many variables. The horsepower and torque available from an electronic fuel injection, direct injection or natural aspirated, diesel engine are dependent upon the density of the air. Many common gases exhibit behavior very close to that of an ideal gas at ambient temperature and pressure. Charged air-intercooling has a number of important benefits. First, because it provides an additional charge air density increase, it allows the specific output of the engine to be increased. Also as a result of the increased charge density, the altitude capability of the engine is increased and the brake specific fuel consumption is improved. Another major benefit of the charge intercooling is that it reduces the operating temperature of cylinder and exhaust system components. As a result, component durability can be improved while avoiding the need to make these components from more expensive high temperature materials. Perhaps the greatest benefit from charged intercooling is its effect on exhaust emissions. Carbon monoxide and particulate emissions are reduced as a direct result of the increased charge density and air-to-fuel ratio. The effect on NOx emissions can be even more dramatic. The in-cylinder NOx formation reactions are temperature dependent and are controlled by the peak cylinder temperature. Depending on the compression ratio of the engine, a 100 degree Fahrenheit (hereinafter "F" or designated by degrees) reduction in the intake manifold temperature lowers the peak cylinder temperature by 250 to 300 degrees F. and can reduce NOx emissions by 30% or more. Because charge intercooling is one of the few ways to reduce NOx emissions without degrading fuel economy or increasing other emissions, it has become a preferred NOx control technology for turbocharged diesel engines. It should also be noted that the charge air temperature achieved with an air-to-air cooling system varies with the ambient air temperature. As a result, the charge temperature is not as closely controlled as with the Dual Cold Air Induction System (DCAI) where the temperature is kept within fairly narrow limits via thermostatic control. Dual Cold Air Induction System is the most powerful form of charge air-intercooling and can, in theory, achieve charge temperatures below ambient. This system uses R134a refrigerant from the existing truck cooling system to supply the DCAI device.

According to the ideal gas law equation, $PV=nRT$, wherein P is the pressure of the gas, V is the volume the gas occupies, n is the number of moles of gas present, R is the universal gas constant and T is the temperature of the gas in absolute temperature units, i.e. in Kelvin, a relationship between the pressure, temperature and volume of the gas exists. This relationship indicates that if the gas is colder, it is denser, and denser air will provide more oxygen, allowing a truck to burn more fuel and make more power because denser than normal air-fuel mixtures are more explosive when ignited, resulting in increased power. A common rule of thumb holds that decreasing air intake temperature by 10 degrees F. will increase horsepower and torque by 1%. The converse is also true, a 10 degree rise in intake temperature decreases horsepower and torque by 1%.

In contrast, lower density air means less oxygen, which leads to an increased fuel consumption and less power. Therefore, the composition of the mixture of air and fuel introduced into the combustion chambers of an internal diesel combustion engine significantly affects performance. As such, trucks' and tractors' diesel engine power may be increased by providing a denser than normal air-fuel mixture at the point of ignition. However, to achieve optimum efficiency, the air/fuel mixture must be appropriately maintained at all levels of operation. To address consumer demand for greater engine power, particularly in the diesel internal combustion engines, turbochargers were developed and installed. Turbochargers are devices which utilize mechanical means to increase the pressure of the air-fuel mixture before it enters the combustion chamber of the diesel internal combustion engine.

The process of the compression raises the air-fuel mixture temperature as well as its pressure to above ambient levels. Since the objective is to increase inlet air density, charged air intercoolers (heat exchangers) are often used to cool the air between compressor delivery and the cylinders, so that the pressure increase is achieved with the maximum rise in density. Since the inlet and exhaust pressures are above ambient, more fuel is burned in the engine. The cylinder pressure through the cycle, and particularly during combustion, is substantially higher for turbocharged cycle. The temperature increase associated with the compression degrades volumetric efficiency (i.e., air-fuel mixture per unit volume) by reducing the density of the air-fuel mixture introduced into the combustion chamber.

A number of modifications and enhancements have been made to conventional diesel internal combustion engines in an effort to improve its performance. For example, it is well known that increasing the volume of air and fuel entering the combustion chambers will result in improved performance. Accordingly, to enhance power from an engine it is desirable to cool the ambient intake air before the pressurized air is delivered to the point of ignition. On many trucks and tractors, the first part of the intake tract the incoming air encounters is a tube designed to channel cold air from the grill or inside the fenderwell into the engine. The air then passes into the air cleaner containing an air filter for removing any incoming dirt, insects, and any other contaminants the air might have picked up off the road. The next object the air is likely to encounter is either a turbocharger or engine intake.

A variety of heat exchangers have been developed that attempt to assist in lowering air intake temperatures, including air-to-air coolers and water-air coolers. Traditional heat exchangers transfer heat from a liquid coolant to the atmosphere; intercoolers, however, may also use a gas as a liquid, such as air, as a cooling medium. Intercoolers are installed on diesel engines today and have been known to improve the efficiency and performance of the turbocharged diesel engines for some time. The intercoolers that have been employed to date for these applications have been in a form that is an additional component to the engine, requiring modification to the engine and/or the turbocharger. Therefore, devices have been utilized which introduce into the air/fuel mixture other liquids in an attempt to cool the mixture prior to combustion. There have also been attempts to provide cooling jackets surrounding the air passages through which the air flows prior to entering the combustion chambers.

In contrast to diesel turbocharged engines, naturally aspirated diesel engines draw air directly from the area surrounding the air inlet and filter system. Efforts have been made to improve volumetric efficiency by positioning this air inlet in locations remote to the remainder of the engine. That is, it has been attempted to reduce the ambient air temperature being drawn into the combustion chamber by remotely locating the point at which atmospheric air is collected. Unfortunately, such efforts have yielded only modest gains in volumetric efficiency.

What has been lacking, however, until the present invention, and what the industry long has sought, is a device that optimizes the temperature of an air-fuel mixture at the point of ignition so as to produce maximum horsepower, torque, fuel economy and fewer emissions from a cold air-fuel combination, which includes controlled temperatures of air from the intake air filter and the compressed air prior to the entry of the engine intake.

Therefore, a previously unaddressed need exists in the industry for a new and useful dual cold air induction system, apparatus and method that is capable of delivering a continuous controlled temperature and/or on demand optimally cold air-fuel mixture for greater horsepower, torque, fuel economy, and less emissions. Particularly, there is a significant need for a dual cold air induction system, apparatus and method that produces the lowest temperature of air possible for an air-fuel mixture into the engine intake at the point of ignition so as to produce maximum horsepower, torque, fuel economy and fewer emissions from the dual air fuel charge.

BRIEF SUMMARY OF THE INVENTION

Given the need addressed above to solve problems associated with apparatuses for cooling air-fuel mixtures in diesel engine trucks, tractors, and motor homes, it would be desirable, and of considerable advantage, to provide a dual cold air induction system, apparatus and method that delivers optimally cooled air-fuel mixtures to achieve increased horsepower, torque, and fuel economy while simultaneously lowering emissions.

The novel dual cold air induction system, apparatus and method of the present invention provides numerous advantages, which are highly desired by the industry, over existing apparatuses. At least one advantage of the present invention is that it decreases the temperature of the intake air entering through the turbocharger (compressor), prior to the compression of air by the compressor side of the turbocharger of the diesel internal combustion engine to significantly increase volume and efficiency of the air. The system and apparatus combines an auxiliary dual air conditioning system, Dual Cold Air Induction device, hereinafter "DCAI," which intakes ambient air and cools the air to a predetermined preset temperature of at least fifty-five (55) degrees below the ambient temperature. The system and apparatus thereafter supplies the cold air at a temperature at least fifteen (15) degrees below ambient temperature to the intake once the charged air passes through the secondary after charged intercooler device by way of a forced constant velocity source of cold air routed to a modified elbow that leads to an air cleaner device. The forced constant velocity of cold air is mixed with the entering ambient air at this modified elbow which leads to the air cleaner device. The conditioned (cooled) air enters the air filter and then passes through the compressor intake side of a turbocharger, a primary after charged intercooler and then a secondary after charged intercooler.

Another advantage of the present invention derives from the fact that the primary apparatus has the advantage of providing an enclosure in the form of a housing for the apparatus that is formed to direct a dual cold air through the apparatus and system, the housing having insulative properties to assist in maintaining a cold air temperature therein the housing to minimize temperature increases of the dual cooled air prior to delivery of the dual cooled air to the compressor intake side of the turbocharger and engine intake point of ignition.

The dual cold air induction system and apparatus also comprises components, including an expansion valve, expansion block valve, two evaporators, a/c suction lines, a/c discharge lines, dual cooling box, four blower motors, temperature switch, climate switch, and cold air outlet pipes.

Another advantage of the present invention is its ability to cool air well below ambient temperatures and provide a constant velocity of air to the air-fuel mixture, without using ice, ice water, antifreeze, or other substances currently utilized in connection with other apparatuses seeking to achieve cooled air for an air-fuel mixture.

Another advantage of the present invention is its ability to significantly increase horsepower, torque, and fuel economy all while simultaneously lowering emissions.

Still another advantage of the dual cold air induction system is that it may be deployed in any truck, tractor and motor home diesel engine vehicle that is model year 2000 or newer, whether single, dual or not turbocharged, or otherwise configured to cool air before directing the air to a point of ignition in the engine. However, earlier year models may be used with the present invention so long as these earlier year models have been overhauled to comply with the new regulations and have also had new computer/chip(s) installed. It is also conceivable to one skilled in the art to apply and adapt various embodiments of the present invention for use with light weight diesel trucks.

It will become apparent to one skilled in the art that the claimed subject matter as a whole, including the structure of the apparatus, and the cooperation of the elements of the apparatus, combine to result in the unexpected advantages and utilities of the present invention. The advantages and objects of the present invention and features of such a dual cold air induction system, apparatus and method will become apparent to those skilled in the art when read in conjunction with the accompanying description, drawing figures, and appended claims.

The foregoing has outlined broadly the more important features of the invention to better understand the detailed description that follows, and to better understand the contribution of the present invention to the art. As to those skilled in the art will appreciate, the conception on which this disclosure is based readily may be used as a basis for designing other structures, methods, and systems for carrying out the purposes of the present invention. The claims, therefore, include such equivalent constructions to the extent the equivalent constructions do not depart for the spirit and scope of the present invention. Further, the abstract associated with this disclosure is neither intended to define the invention, which is measured by the claims, nor intended to be limiting as to the scope of the invention in any way.

These together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be made to the accompanying drawings and descriptive matter in which there are illustrated preferred embodiments of the invention.

It should be understood that any one of the features of the invention may be used separately or in combination with other features. It should be understood that features which have not been mentioned herein may be used in combination with one or more of the features mentioned herein. Other systems, methods, features, and advantages of the present invention will be or become apparent to one with skill in the art upon examination of the drawings and detailed description. It is intended that all such additional systems, methods, features, and advantages be protected by the accompanying claims.

These and other objects, features and advantages of the present invention will be more readily apparent when considered in connection with the following, detailed description of preferred embodiments of the invention, which description is presented in conjunction with annexed drawings below.

BRIEF DESCRIPTION OF THE SEVERAL VIEWS OF THE DRAWING

The foregoing summary as well as the following detailed description of the preferred embodiment of the invention will be better understood when read in conjunction with the appended drawings. It should be understood, however, that the invention is not limited to the precise arrangements and instrumentalities shown herein. The components in the drawings are not necessarily to scale, emphasis instead being placed upon clearly illustrating the principles of the present invention. Moreover, in the drawings, like reference numerals designate corresponding parts throughout the several views.

The invention may take physical form in certain parts and arrangement of parts. For a more complete understanding of the present invention, and the advantages thereof, reference is now made to the following descriptions taken in conjunction with the accompanying drawings, in which.

DETAILED DESCRIPTION OF THE INVENTION

Figure 1:
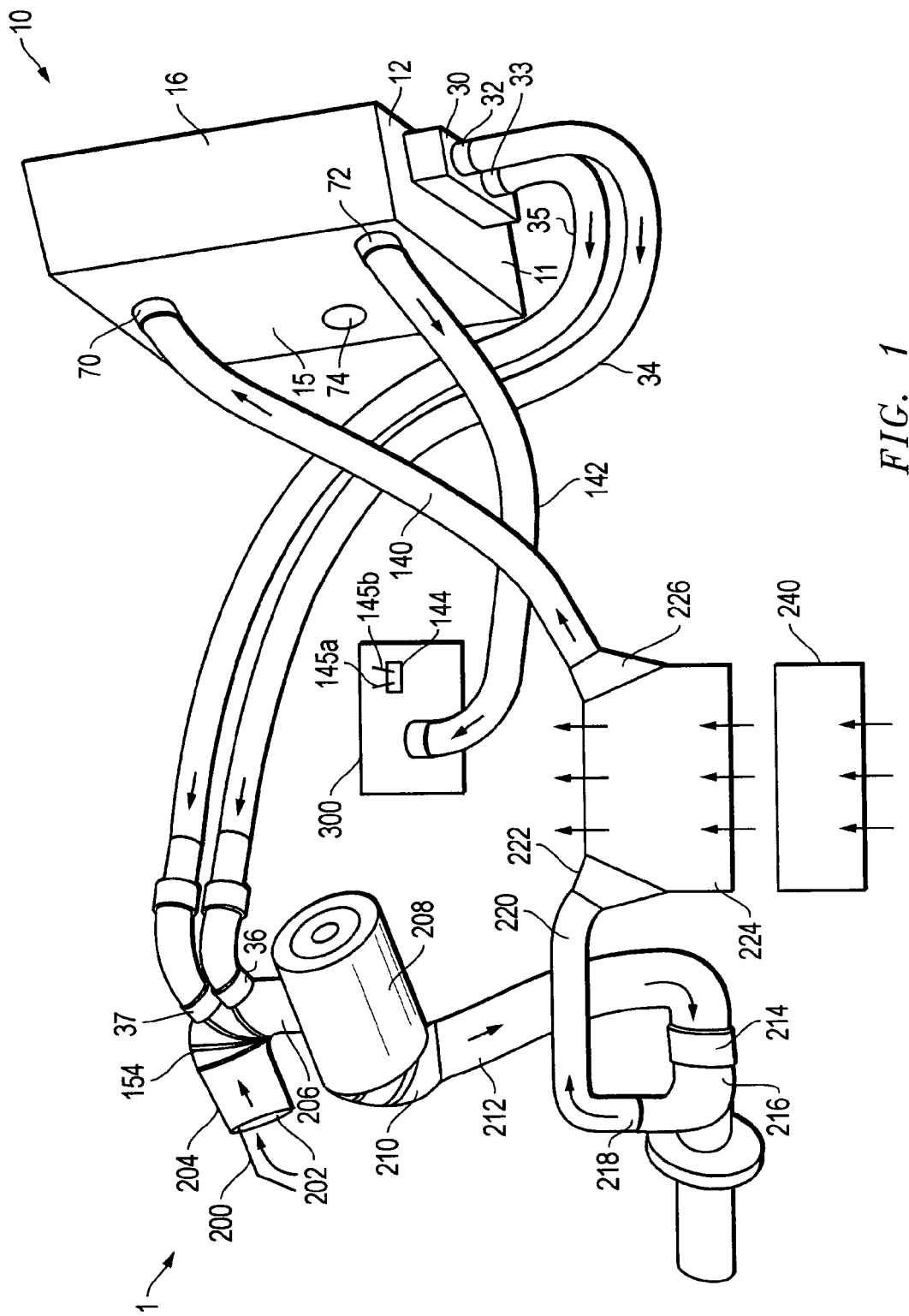
FIG. 1 is a perspective view of the complete system configuration with ambient airflows and conditioned cold air flows of the dual cold air induction system and apparatus according to an embodiment of the present invention.

The following discussion is presented to enable a person skilled in the art to make and use the invention. The general principles described herein may be applied to embodiments and applications other than those detailed below without departing from the spirit and scope of the present invention as defined by the appended claims. The present invention is not intended to be limited to the embodiments shown, but is to be accorded the widest scope consistent with the principles and features disclosed herein.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative of but a few of the various ways in which the principles of the invention may be employed. Other objects, advantages, and novel features of the invention will become apparent from the following detailed description of the invention when considered in conjunction with the drawings.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

As shown in FIG. 1, the present invention disclosed hereinbelow describes a dual cold air induction system 1 and apparatus specifically designed to maintain a preset predetermined constant cold air temperature via an automatic thermostat controlled forced velocity of cold air to an air cleaner 208 and an engine intake 300 of a truck, tractor or motor home, wherein the cold air enters into the air cleaner 208 in advance of the air cleaner filtration system. The air cleaner 208 allows only 40% of ambient air to enter the original unit. The second portion of the apparatus reduces the air temperature, which is passed through a secondary after charged intercooler 84 (FIG. 2) and routed back to the engine intake system 300. One skilled in the art, however, will understand that the secondary after charged intercooler (FIG. 2) 84 may be replaced with a plurality of pipes without departing from the scope and spirit of the present invention. Installation and use of the present invention's Dual Cold Air Induction (DCAI) system 1 and apparatus increases efficiency by increasing horsepower and torque, lowering exhaust emissions and significantly increasing fuel economy. For example, prior to installation of the DCAI system 1, the test vehicle (a 2006 Kenworth T-800 tractor with a 475 hp Cummins engine) averaged 6.2 miles per gallon ("MPG"). Once installed in the test vehicle, however, the fuel economy increased to an average of 11.8 MPG or 0.003-0.002 gallons per second of fuel consumption.

The minimum diesel truck specifications for use with the system and apparatus of the present invention comprise a diesel engine (e.g., engines from over-the-road tractors and ranging from 200 hp engines and greater) having year models of at least 2000 and newer including, but not limited to, medium duty trucks to commercial over-the-road tractors. The year model restriction is due to the ability of newer trucks' onboard computer compatibility related to compiling new engine readings and writing the improved efficiency (created by the present invention as described hereinbelow) to the (E-PROM) or other computer chip. Earlier year models, however, may be used with the present invention so long as these earlier year models have been overhauled to comply with the new regulations and have also had new computer/chip(s) installed. It is conceivable to one skilled in the art to apply and adapt the present invention's various embodiments for use with light weight diesel trucks.

Heat is the enemy when it comes to engine horsepower. Today's Engine Control Modules (ECMs) and Vehicle Electronic Control Units (VECUs) rely heavily on engine speed, vehicle speed, commanded fueling, coolant temperature, intake manifold temperature, engine oil temperature, ambient air temperature sensors, barometric pressure, engine oil pressure, turbocharger boost levels, throttle position sensor, intake manifold pressure, crank case pressure, exhaust backpressure, injectors and fuel metering systems. These components send information to the ECM and all characteristics are considered by the ECM and VECU to maintain the engine at optimum efficiency. In addition, a cooler temperature within the Intake Manifold Temperature ("IMT") plays an important role in reducing emissions and improving fuel economy. The benefits known to be attributed to cooler IMTs are that cooler air comprises higher oxygen content; and in response, the ECMs and VECUs on today's computerized trucks will allow the computer to make all necessary adjustments to other engine components for optimum efficiency when the cooler IMT air is sensed and all other component information is considered, thereby allowing the engine to run leaner and, as a result, yield increased horsepower and performance.

The present invention, as will now be described in detail, provides for the desirable cooler IMT temperature readings via the DCAI system 1 and apparatus disclosed herein. The DCAI system 1 ingests ambient air and cools the ingested ambient air to a preset predetermined temperature of at least fifty-five (55) degrees below the ambient temperature and then supplies cooled air having a temperature of at least fifteen (15) degrees below ambient temperature ultimately to the engine intake 300. The achieved result is a cooler engine temperature, reduced emissions and a substantially improved fuel economy having about an additional 5 miles per gallon in fuel economy than that of a truck diesel engine without the present invention installed. The DCAI system 1 and apparatus, in conjunction with the onboard truck computer, compensates for the changes in efficiency in all engine components.

Figure 2:
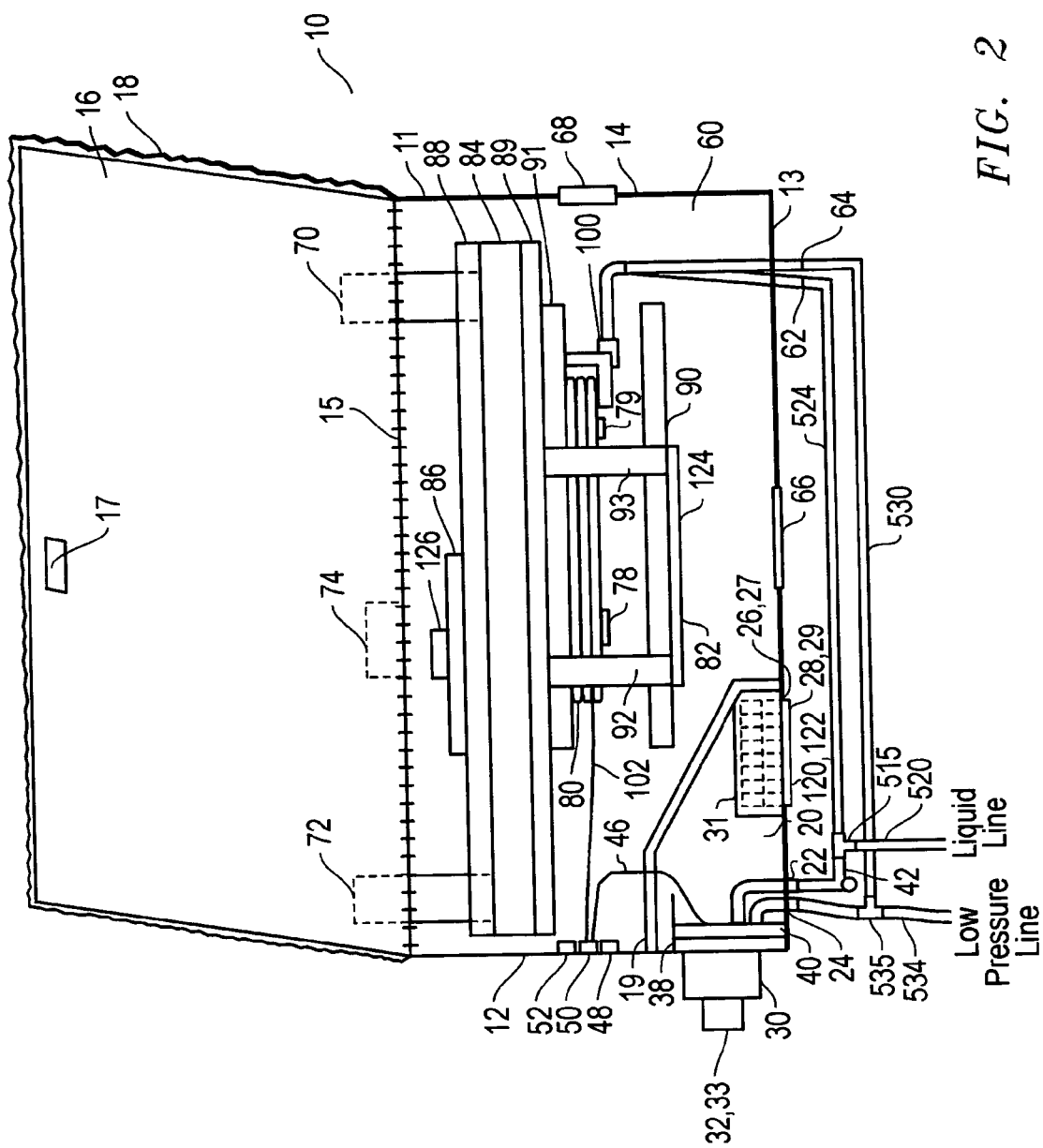
FIG. 2 is a top view of the dual air cooling unit according to one embodiment of the present invention.
Figure 3:
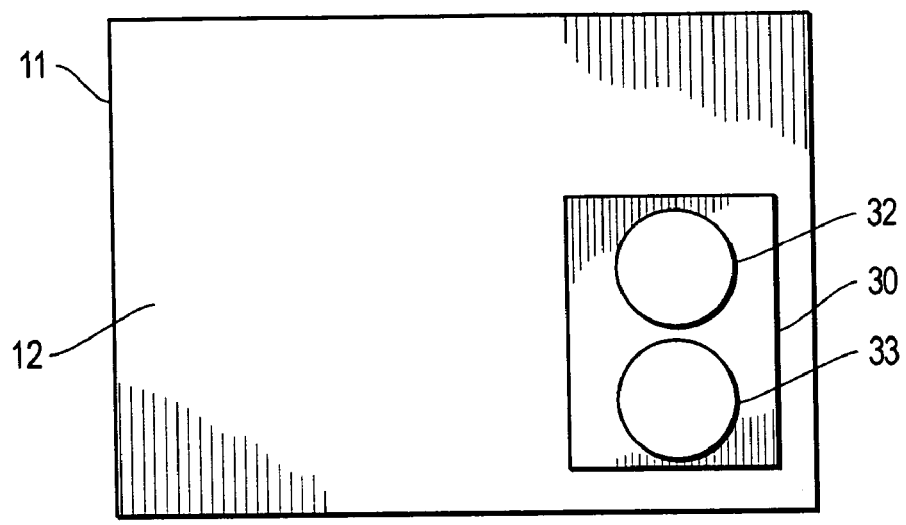
FIG. 3 is a left view of the dual air cooling unit according to one embodiment of the present invention.
Figure 4:
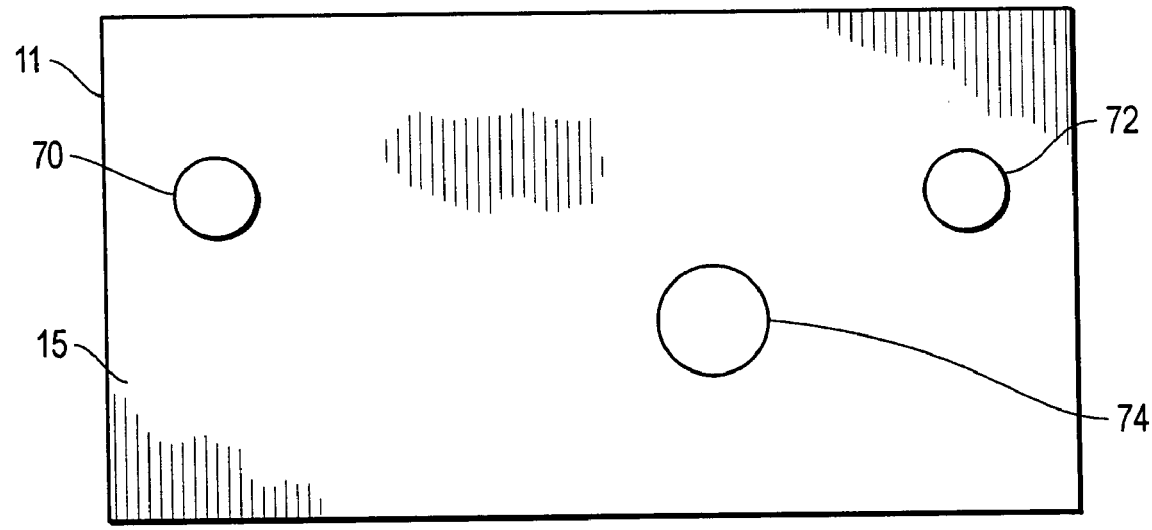
FIG. 4 is a front view of the dual air cooling unit according to one embodiment of the present invention.
Figure 5:
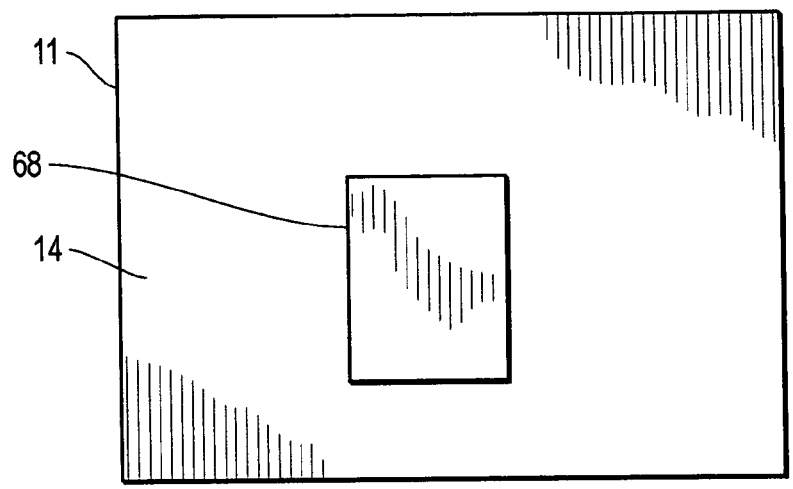
FIG. 5 is a right view of the dual air cooling unit according to one embodiment of the present invention.

Now turning to FIGS. 1 through 5, specifically FIGS. 1 and 2, the present invention provides a dual cold air induction (DCAI) system 1 comprising of a dual air cooling unit 10 apparatus and method of using the system. The heart of the present invention's DCAI system 1 is the implementation of a primary evaporator cooling device 40 and a secondary evaporator cooling device 80 disposed within the dual air cooling unit 10, which will be described in operation hereinbelow, for reducing the air temperature in the air-fuel mixture during the diesel internal combustion engine's operation.

Figure 6:
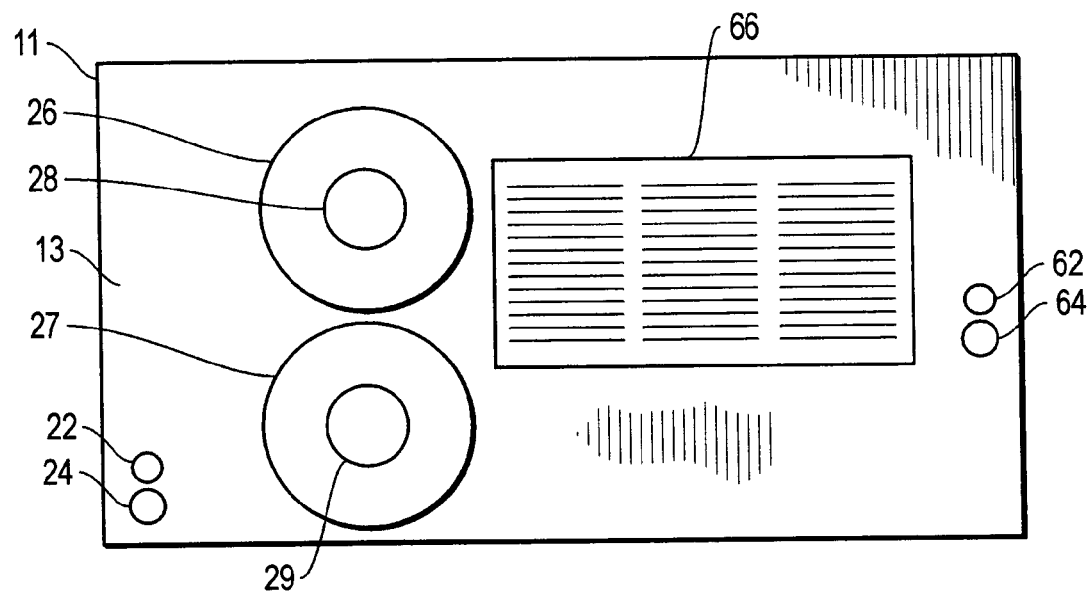
FIG. 6 is a rear view of the dual air cooling unit according to one embodiment of the present invention.

As shown in FIGS. 1 and 2, the DCAI system 1 comprises a fully insulated 18 cooling unit housing 11 (also shown in FIGS. 3 through 6) having a left side 12 (also shown in FIG. 3), a rear side 13 (also shown in FIG. 6), a right side 14 (also shown in FIG. 5) and a front side 15 (also shown in FIG. 4), for containing a plurality of components that make up the dual air cooling unit 10. The housing 11 can be constructed from any suitable sturdy and resilient substrate material having characteristic properties that assist in the prevention of interior housing heating and/or radiation of internally cooled air. These materials include metals and plastics, but are not limited exclusively to these materials. The embodiment depicted in FIGS. 1 and 2 is of ¼" aluminum plate construction having a hinged top cover 16 with a swivel latch 17, for securement to ensure an air tight seal, and insulated with a heat resistant insulated material 18, whereby the heat resistant insulated material 18 hinged top cover 16 permits easy access to the internal components of the dual air cooling unit 10. The hinged top cover 16 is depicted in FIG. 2 as being partially hinged open for access. In operation, however, the hinged top cover 16 must be closed to achieve desired results. The housing's 11 dimensions in the embodiment shown have a length "l" of about 35 inches, a width "w" of about 25 inches and a height "h" of about 18 inches. It will be understood by one skilled in the art, however, that the overall dimensions of the housing 11, the primary evaporator cooling device 40 and the secondary evaporator cooling device 80 may be different for each motor vehicle application. Also, although the preferred embodiment depicts the housing 11 as rectangular in shape, one skilled in the art will understand that the housing 11 is not limited only to cube or rectangular shapes, but may be constructed in any geometric shape without departing from the scope and spirit of the present invention.

As seen in FIG. 2, within the dual air cooling unit's 10 housing 11, an air deflector/barrier wall 19 partitions the dual air cooling unit's 10 interior into a primary cold air induction box 20 and a secondary cold air induction box 60. Although the preferred embodiment depicts the housing 11 being partitioned into the primary cold air induction box 20 and the secondary cold air induction box 60, one skilled in the art will understand that the housing 11 can be non-partitioned, wherein all the necessary components are placed within the housing, without departing from the scope and spirit of the present invention. The primary cold air induction box 20 is located along a portion of the housing's 11 left side 12 and a portion of its rear side 13. The housing's 11 rear side 13, used for the primary cold air induction box 20, is formed having a primary liquid line inlet port 22 (also shown in FIG. 6), a primary suction line outlet port 24 (also shown in FIG. 6), and primary ambient air ingestion inlets 26, 27 (also shown in FIG. 6) for installation of a first primary system blower fan 28 (also shown in FIG. 6) and a second primary system blower fan 29 (also shown in FIG. 6) for ingesting ambient air. The housing's 11 left side 12, used for the primary cold air induction box 20, is formed having a plenum 30 (also shown in FIGS. 1 and 3), which is in communication with the primary evaporator cooling device 40, and two plenum cold air outlet ports 32, 33 (also shown in FIGS. 1 and 3).

As further seen in FIG. 2, the secondary cold air induction box 60 is located along a portion of the housing's 11 left side 12, a portion of its rear side 13, substantially all of the right side 14, and substantially all of the front side 15. The housing's 11 rear side 13, used for the secondary cold air induction box 60, is formed having a secondary liquid line inlet port 62 (also shown in FIG. 6), a secondary suction line outlet port 64 (also shown in FIG. 6), and a secondary ambient air inlet vent 66 (also shown in FIG. 6). The housing's right side 14, used for the secondary cold air induction box 60, is formed having a secondary evaporator service panel 68 (also shown in FIG. 5), which is about 8" wide and about 10" long. It will be understood by one skilled in the art, however, that the overall dimensions of the secondary evaporator service panel 68 may vary without departing from the scope or spirit of the present invention. The housing's 11 front side 15, used for the secondary cold air induction box 60, is formed having a secondary after charged intercooler inlet port 70 (also shown in FIGS. 1 and 4), a secondary after charged intercooler outlet port 72 (also shown in FIGS. 1 and 4), and a secondary ambient air outlet vent 74 (also shown in FIGS. 1 and 4).

As can be more readily seen in FIG. 2, the air deflector/barrier wall 19 is mounted on the housing's 11 left side 12 and extends substantially perpendicular from the left side 12 towards the secondary evaporator cooling device 80 and then angles substantially toward the rear side 13, to form the primary cold air induction box 20, and the secondary cold air induction box 60. The primary cold air induction box 20 is completely segregated from the secondary cold air induction box 60. The first primary system blower fan 28, the second primary system blower fan 29, the primary evaporator cooling device 40, and the plenum 30 are all located within the primary cold air induction box 20. The first primary system blower fan 28 and the second primary system blower fan 29 are disposed within a primary system blower fan housing 31 within the dual air cooling unit 10 and are mounted vertically on the housing's 11 rear side 13. The first primary system blower fan 28 and the second primary system blower fan 29 are mounted such that the blades are facing the air deflector's/wall barrier's 19 angled portion. The primary evaporator cooling device 40 is mounted to the housing's 11 left side 12 via a primary evaporator cooling mounting bracket 38, which is also attached to the housing's 11 left side 12. The plenum is located on the outside of the housing's 11 left side 12 and communicates the ambient air from the primary evaporator cooling device 40 to the two plenum cold air outlet ports 32, 33. In one of the embodiments, the two plenum cold air outlet ports 32, 33 are about 3" each, but one skilled in the art will understand that the sizes of the two plenum cold air outlet ports 32, 33 may vary depending on the system requirements.

FIG. 2 also depicts a secondary system blower fan 82, the secondary evaporator cooling device 80, the secondary after charged intercooler 84, and a secondary system suction fan 86, which are all located within the secondary cold air induction box 60. One skilled in the art, however, will understand that the secondary after charged intercooler 84 may be replaced with a plurality of pipes without departing from the scope and spirit of the present invention. It will be understood that wherever the secondary after charged intercooler 84 is mentioned hereinafter, a plurality of pipes may be substituted in its place without altering the function of the secondary after charged intercooler 84. The secondary system blower fan 82 is disposed within the dual air cooling unit's 10 secondary cold air induction box 60 and is vertically mounted on a secondary system blower fan mounting bracket 90, which is located near the housing's 11 rear side 13 and opposite the secondary ambient air inlet vent 66. The secondary after charged intercooler 84 is also vertically mounted to a first secondary after charged intercooler mounting bracket 88, which is located near the housing's 11 front side 15, and a second secondary after charged intercooler mounting bracket 89, which is located near the secondary system blower fan 82. A fan/secondary after charged intercooler horizontal mounting bracket 91 is attached to the second secondary after charged intercooler mounting bracket 89, along the side near the secondary system blower fan 82. The secondary system blower fan mounting bracket 90 is secured to the fan/secondary after charged intercooler horizontal mounting bracket 91 via two fan/secondary after charged intercooler perpendicular mounting brackets 92, 93. The secondary evaporator cooling device 80 is located between the secondary system blower fan 82 and the second secondary after charged intercooler mounting bracket 89, and is mounted via two secondary evaporator cooling mounting brackets 78, 79. The secondary system suction fan 86 is mounted to the first secondary after charged intercooler mounting bracket 88, such that its blades are facing the first secondary after charged intercooler mounting bracket 88 and opposite from the secondary ambient air outlet vent 74. Additionally, the secondary after charged intercooler 84 is in communication with the secondary after charged intercooler inlet port 70 and the secondary after charged intercooler outlet port 72. In one of the embodiments, the secondary after charged intercooler inlet port 70 and the secondary after charged intercooler outlet port 72 are both about 3" each, but one skilled in the art will understand that the sizes of the two ports 70, 72 may vary depending on the system requirements.

In continued reference to FIGS. 1 and 2, the primary evaporator cooling device 40 acts as a small radiator but instead of containing hot antifreeze it contains a refrigerant gas, such as, but not limited to, R134a. The gas passes through the primary evaporator cooling device 40, thus making it very cold. The dual air cooling unit 10 housing's 11 first primary system blower fan 28 and second primary system blower fan 29 push ambient air through the primary evaporator cooling device 40 for conditioning and eventual mixing with unconditioned ambient air at a modified elbow 154, just prior to the air cleaner 208 entrance. A primary expansion valve 42 (also shown in FIG. 7) is disposed in communication with the primary evaporator liquid line 520 (also shown in FIG. 7), wherein the primary expansion valve 42 is responsive to a primary temperature sensor probe 46 controlled by an adjustable primary thermostat 48 set by a primary temperature switch 50 for maintaining a preset predetermined temperature of at least fifty-five (55) degrees below ambient temperature within the primary cold air induction box 20. As mentioned above, heat resistant insulative materials 18 completely surround the housing 11 to prevent undesirable heat from entering or affecting the housing. The primary expansion valve 42 regulates the flow of refrigerant gas inside the primary evaporator cooling device 40 via the primary evaporator liquid line 520. The primary temperature sensor probe 46 measures the temperature at the primary evaporator cooling device 40 core near where the primary expansion valve 42 is located. The primary expansion valve 42 regulates the refrigerant's flow by opening and closing to meter the amount of refrigerant entering the primary evaporator cooling device 40. The present embodiment is capable of utilizing R134a refrigerant but is not limited thereto. It is contemplated that one skilled in the art will understand that other refrigerants that may enter the market, or that may currently exist but are not listed herein, can be used and further remain within the scope and spirit of the disclosed invention described herein.

Furthermore, in continuous reference to FIGS. 1 and 2, the secondary evaporator cooling device 80 also acts as a small radiator but instead of containing hot antifreeze it contains a refrigerant gas, such as, but not limited to, R134a. The gas passes through the secondary evaporator cooling device 80, thus making it very cold. The dual air cooling unit 10 housing's 11 secondary system blower fan 82 pushes ambient air through the secondary evaporator cooling device 80 and through the secondary after charged intercooler 84, which are used for conditioning the air within the secondary after charged intercooler 84 just prior to being sent to the engine intake 300. A secondary expansion block valve 100 (also shown in FIG. 7) is disposed in communication with a secondary evaporator liquid line 524 (also shown in FIG. 7), wherein the secondary expansion block valve 100 is responsive to a secondary temperature sensor probe 102 controlled by the adjustable primary thermostat 48 set by the primary temperature switch 50 for maintaining a preset predetermined temperature of at least fifty-five (55) degrees below ambient temperature within the secondary cold air induction box 60. As mentioned above, insulative materials 18 completely surround the housing 11 to prevent undesirable heat from entering or affecting the housing. Although the preferred embodiment depicts the secondary temperature sensor probe 102 being controlled by the adjustable primary thermostat 48 and set by the primary temperature switch 50, one skilled in the art will understand that the secondary temperature sensor probe 102 can be controlled by a secondary thermostat (not shown) which can be set by a secondary temperature switch (not shown) without departing from the scope and spirit of the present invention. Thus, the primary evaporator cooling device 40 and the secondary evaporator cooling device 80 may be regulated independently by two separate temperature switches and thermostats.

The secondary expansion block valve 100 regulates the flow of refrigerant gas inside the secondary evaporator cooling device 80 via the secondary evaporator liquid line 524. The secondary temperature sensor probe 102 measures the temperature at the secondary evaporator cooling device 80 core near where the secondary expansion block valve 100 is located. The secondary expansion block valve 100 regulates the refrigerant's flow by opening and closing to meter the amount of refrigerant entering the secondary evaporator cooling device 80. The primary temperature switch 50 controls the temperature of the primary evaporator cooling device 40 and the secondary evaporator cooling device 80 and is located on the inside of the housing's 11 left side 12. A climate switch 52, also located on the housing's 11 left side 12, has two settings (normal condition and extreme hot condition), wherein the normal condition setting allows the primary temperature switch 50 to regulate the temperature for the primary evaporator cooling device 40 and the secondary evaporator cooling device 80 while the extreme hot condition setting overrides the primary temperature switch's 50 control so that the maximum cooling can occur within the dual air cooling unit 10. The present embodiment is capable of utilizing R134a refrigerant but is not limited thereto. It is further contemplated that one skilled in the art will understand that other refrigerants that may enter the market, or that may currently exist, but are not listed herein, can be used and further remain within the scope and spirit of the disclosed invention described herein.

The present invention's method of providing cold air into the diesel engine's point-of-ignition can be understood while viewing FIGS. 1 and 2 in conjunction. Ambient air enters the dual cold air induction system 1 through an ambient air inlet 202 and into the ambient air channel 204 via an ambient air deflector 200. The ambient air deflector 200 is positioned away from the other heated elements such that the ambient air enters the dual cold air induction system 1 at a cooler temperature than if the ambient air deflector 200 were not installed. In the preferred embodiment, the ambient air channel 204 is a 10" diameter tube with a modified elbow 154 that leads into the air cleaner 208 via an air cleaner inlet port 206.

Simultaneously, the first primary system blower fan 28 and the second primary system blower fan 29 draw ambient air into the primary cold air induction box 20 via the primary ambient air ingestion inlets 26, 27. The ambient air is force blown at constant velocity towards the primary evaporator cooling device 40 by traveling along the air deflector's/wall barrier's 19 direction. The ambient air is conditioned to a preset temperature of at least fifty-five (55) degrees below the ambient temperature once it is blown across the primary evaporator cooling device 40. The conditioned air then enters the plenum 30 and exits the primary cold air induction box 20 via the two plenum cold air outlet ports 32, 33. The conditioned ambient air is force blown at constant velocity through primary cold air channels 34, 35 and enters the ambient air channel 204 at its modified elbow 154 via two ambient air channel inlet ports 36, 37. The ambient air and the conditioned ambient air are mixed at the modified elbow 154 and then enter the air cleaner 208 at a cooler than ambient temperature. In the preferred embodiment, the primary cold air channels 34, 35 are 3" diameter tubes, but one skilled in the art will understand that the primary cold air channels' 34, 35 diameters may vary depending on the system requirements.

Once the mixed ambient air enters the air cleaner 208, the conditioned ambient air is filtered to remove any incoming dirt, insects, and any other contaminants the air might have picked up off the road. The filtered conditioned air exits the air cleaner 208 via an air cleaner outlet port 210 and travels through an air cleaner channel 212 and into the compressor intake side of a turbocharger 216 via a turbocharger compressor side inlet port 214. The compressor side of the turbocharger 216 increases the filtered conditioned air's pressure upon demand, as well as its temperature. The pressurized conditioned air then exits the compressor discharge side of the turbocharger 216 via a turbocharger compressor side outlet port 218 and enters a turbocharger compressor side channel 220. The pressurized conditioned air travels through the turbocharger compressor side channel 220 and enters a primary after charged intercooler 224 via a primary after charged intercooler inlet port 222. The pressurized conditioned air is further conditioned in the primary after charged intercooler 224, thereby increasing the density of the pressurized conditioned air. The further conditioned air then exits the primary after charged intercooler 224 via a primary after charged intercooler outlet port 226 and enters a primary after charged intercooler channel 140. The primary after charged intercooler 224 operates to cool the pressurized conditioned air by means of ambient air entering through the vehicle's grill (not shown) and passing across the original A/C condenser 240 (also shown in FIG. 7) and through the primary after charged intercooler's fins (not shown).

The further conditioned air travels through the primary after charged intercooler channel 140 and enters the secondary after charged intercooler 84, which is located in the secondary cold air induction box 60, via the secondary after charged intercooler inlet port 70. Once the air enters the secondary after charged intercooler inlet port 70, the air travels through the secondary after charged intercooler 84, where the air is further conditioned thereby further increasing the density of the conditioned air. The air's density is increased by reducing its temperature and thereby increasing its volumetric efficiency. The further conditioned air then exits the secondary after charged intercooler 84 through the secondary after charged intercooler outlet port 72.

Thereafter, the further conditioned air enters into a secondary after charged intercooler channel 142 and across an intake manifold temperature ("IMT") sensor 144 having wires 145a and 145b for connection to the vehicle's computer system. The IMT sensor 144, which is located at the engine intake 300, is used to determine the proper fuel/air mixture and is a sensitive piece of equipment that reports to the computer the current conditions such as, but not limited to, air temperature, air flow and actual volume of air ingested. After flowing across the IMT sensor 144, the further conditioned air travels to the engine intake 300, wherein the temperature of the further conditioned air entering the engine intake 300 is now at least fifteen (15) degrees below the ingested ambient air temperature.

As seen in FIG. 2, with the present invention's dual air cooling unit 10 installed and engaged, the primary evaporator cooling device 40 and the secondary evaporator cooling device 80 maintain a constant preset predetermined temperature as described above. The primary evaporator cooling device 40 utilizes the primary temperature sensor probe 46 and primary expansion valve 42 to effectively regulate the amount of refrigerant flow to the primary evaporator cooling device 40. The secondary evaporator cooling device 80 utilizes the secondary temperature sensor probe 102 and secondary expansion block valve 100 to effectively regulate the amount of refrigerant flow to the secondary evaporator cooling device 80. In cold weather climates the first primary system blower fan 28, the first primary system blower fan motor 120, the second primary system blower fan 29, the second primary system blower fan motor 122, the secondary system blower fan 82, the secondary system blower fan motor 124, the secondary system suction fan 86, and the secondary system suction fan motor 126 will be the only components of the dual air cooling unit 10 engaged. In the event the ambient air within the dual air cooling unit 10 rises above the preset temperature described above, the dual air cooling unit 10 will automatically engage the primary evaporator cooling device 40, the secondary evaporator cooling device 80 and other associated components to effectuate the cooling off process until the preset predetermined temperature is achieved. The primary temperature switch 50 sets the desired preset predetermined temperature.

In FIG. 2, the top view of the dual air cooling unit 10 is shown. The dual air cooling unit's 10 components are depicted in detail along with their relative positioning. The operation has been described above. Furthermore, FIG. 2, with additional reference to FIG. 7, shows a second suction line tee joint 535 connecting the secondary evaporator suction line 530 to the primary evaporator suction line 534 and a second liquid line tee joint 515 connecting the secondary evaporator liquid line 524 to the primary evaporator liquid line 520.

Figure 7:
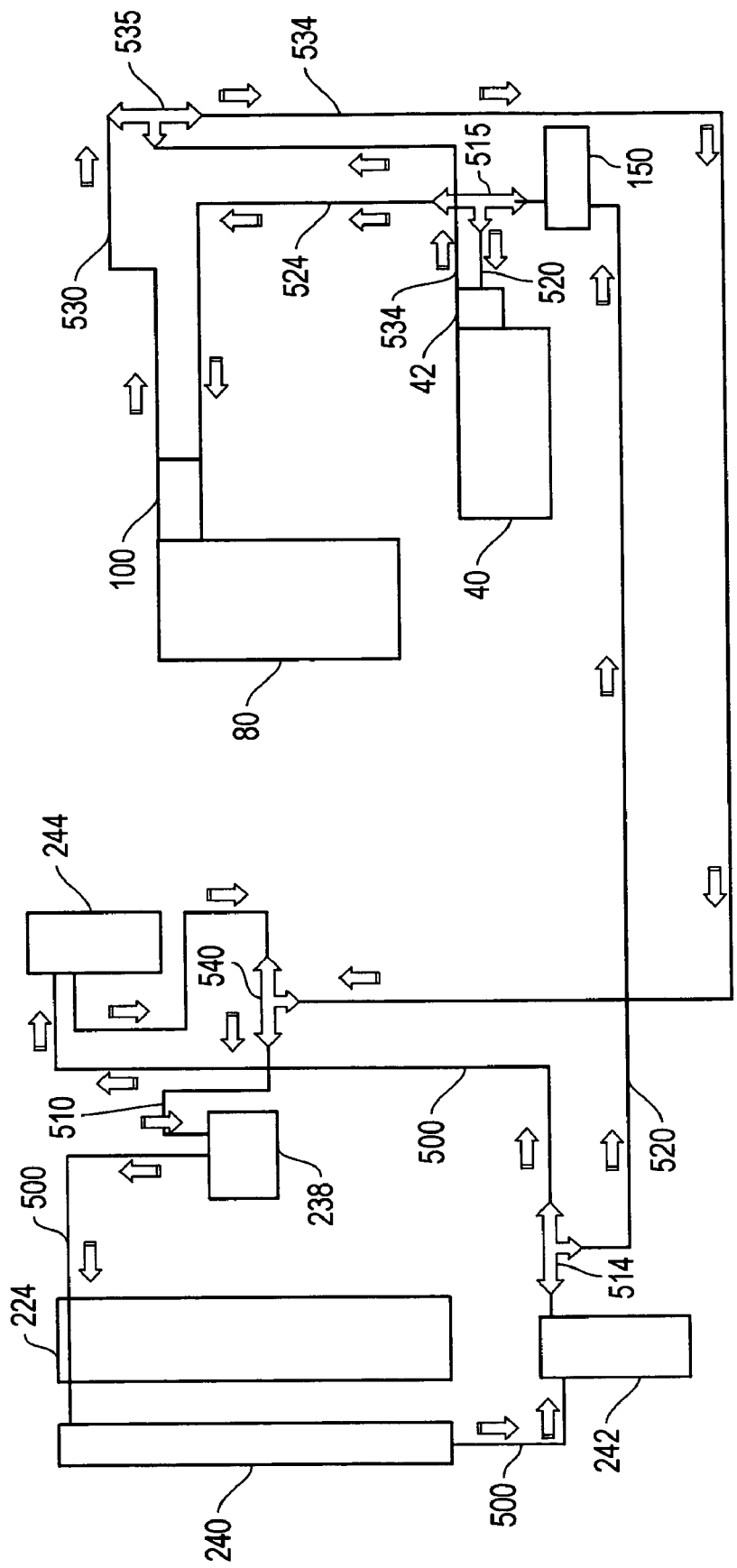
FIG. 7 is a schematic depiction of the supplemental air conditioner system line routing according to one embodiment of the dual cold air induction system and apparatus according to the present invention.

FIG. 7 illustrates a detailed schematic of the dual cold air induction system's 1 air conditioner line routing. FIG. 7 depicts the vehicle's original A/C compressor 238, which compresses the refrigerant prior to conditioning it in the original A/C condenser 240 via an original high pressure liquid line 500. The original high pressure liquid line 500 travels from the original A/C compressor 238, across the primary after charged intercooler 224, and into the original A/C condenser 240. After the refrigerant is condensed in the original A/C condenser 240, the refrigerant flows to the vehicle's original accumulator/dryer 242 which is utilized for the separation of gas and liquid and also to remove any dirt and moisture. After departing the original accumulator/dryer 242, the refrigerant flows to a first liquid line tee joint 514 which connects the primary evaporator liquid line 520 to the original high pressure liquid line 500, which goes from the original accumulator/dryer 242 to an original evaporator 244. The refrigerant then splits and flows along the new primary evaporator liquid line 520, which travels from the first liquid line tee joint 514 to a secondary accumulator/dryer 150 for further gas/liquid separation and dirt and moisture removal. The refrigerant then continues to flow along the primary evaporator liquid line 520 traveling from the secondary accumulator/dryer 150 to the second liquid line tee joint 515 so that the refrigerant supply may branch to the primary evaporator cooling device 40 and the secondary evaporator cooling device 80. The refrigerant then continues along the primary evaporator liquid line 520 from the second liquid line tee joint 515 and into the primary evaporator cooling device 40, which is regulated by the primary expansion valve 42.

The primary expansion valve 42 is connected at one end to the primary evaporator cooling device 40 via the primary evaporator liquid line 520 and at a second end to the primary evaporator suction line 534 via a connection (not shown). The primary expansion valve 42 controls the refrigerant's flow by measuring its flow rate and temperature. The refrigerant also flows along the secondary evaporator liquid line 524 from the second liquid line tee joint 515 and into the secondary evaporator cooling device 80, which is regulated by the secondary expansion block valve 100. The secondary expansion block valve 100 is connected at one end to the secondary evaporator cooling device 80 via the secondary evaporator liquid line 524 and at a second end to the secondary evaporator suction line 530 via a connection (not shown). The secondary expansion block valve 100 controls the refrigerant's flow by measuring its pressure.

Within the original evaporator 244, the primary evaporator cooling device 40 and the secondary evaporator cooling device 80, the pressurized liquid refrigerant flowing from the liquid lines 500, 520 and 524 are depressurized and turn into a refrigerant gas. The refrigerant gas exiting the secondary evaporator cooling device 80 travels through the secondary evaporator suction line 530 and joins the refrigerant gas exiting the primary evaporator cooling device 40, which is traveling through the primary evaporator suction line 534, at a second suction line tee joint 535. The refrigerant gas continues to flow to a first suction line tee joint 540 through the primary evaporator suction line 534 and mixes with the refrigerant gas exiting the original evaporator 244 through a low pressure suction line 510. The refrigerant gas then flows from the first suction line tee joint 540 to the original A/C compressor 238, where it is again pressurized and turned into a liquid refrigerant.

Operational Summary

Reference FIGS. 1, 2, and 7, are used for providing an operational summary for the system, which is detailed hereinbelow. The following summary is not meant to be exclusive of any previously described process or components, but is intended to provide a basic application and understanding of how the system and apparatus of the present invention is operationally utilized.

In operation, the dual air cooling unit 10 is mounted near the rear side of a truck, tractor or motor home's cab, however, one skilled in the art will understand that the dual air cooling unit 10 is not limited only to this location. Whenever the temperature within the dual air cooling unit 10 falls below a preset predetermined temperature, the vehicle's dual cold air induction system 1 is automatically activated, thereby allowing the ambient air entering the dual air cooling unit 10 to be cooled (conditioned) by the primary after charged intercooler 224 and the secondary after charged intercooler 84. The first primary system blower fan 28 and the second primary system blower fan 29, located in the primary cold air induction box 20, push a constant forced velocity of ambient air through the automatically activated primary evaporator cooling device 40 which conditions the ambient air prior to mixing it with the ambient air entering the system at the modified elbow 154, just prior to the air cleaner 208 entrance. The mixed air is filtered and then enters the compressor intake side of a turbocharger 216 which pressurizes the air as well as increases its temperature. The compressed air is then cooled in the primary after charged intercooler 224 by means of ambient air passing across the primary after charged intercooler's 224 fins. The conditioned air is then drawn into the secondary cold air induction box 60 and through a secondary after charged intercooler 84 for further conditioning. The secondary system blower fan 82, which is located in the secondary cold air induction box 60, pushes ambient air through the automatically activated secondary evaporator cooling device 80 for cooling and then through the fins located on the outer side of the secondary after charged intercooler 84. A secondary system suction fan 86 is used to help draw the cooled ambient air through the secondary after charged intercooler 84. The conditioned air is then sent from the secondary after charged intercooler 84 and into the engine intake 300.

The temperature within the dual air cooling unit's 10 primary cold air induction box 20 is regulated using the primary expansion valve 42 that is responsive to the primary temperature sensor probe 46 and controlled by the adjustable primary thermostat 48 set by the primary temperature switch 50 for maintaining a preset predetermined temperature of at least fifty-five (55) degrees below ambient temperature. The temperature within the dual air cooling unit's 10 secondary cold air induction box 60 is regulated using the secondary expansion block valve 100 that is responsive to the secondary temperature sensor probe 102 and controlled by the adjustable primary thermostat 48 set by the primary temperature switch 50 for maintaining a preset predetermined temperature of at least fifty-five (55) degrees below ambient temperature. The climate switch 52 has two settings (normal condition and extreme hot condition), wherein the normal condition setting allows the primary temperature switch 50 to regulate the temperature for the primary evaporator cooling device 40 and the secondary evaporator cooling device 80 while the extreme hot condition setting overrides the primary temperature switch's 50 control so that the maximum cooling can occur within the dual air cooling unit 10. The dual cold air induction system 1 increases the diesel engine's fuel efficiency, horsepower and torque output.

Test Data Summary

Specific results from actual road tests are presented below. These tests were conducted with and without the present invention's DCAI system 1 installed on the test vehicle. A Snap On (SPX/OTC) Diagnostic Computer and software packages were used for conducting and analyzing such tests on the test vehicle (as mentioned above, the test vehicle was a 2006 Kenworth T-800 tractor with a 475 hp Cummins engine). The specific conditions for the tests conducted and computerized test results are as follows:

Abbreviations:

| Data Monitored: | Term Definition: |
|---|---|
| a. IMT Temperature | "IMT"—Intake Manifold |
| b. ECT Sensor | "ECT"—Engine Coolant Temperature |
| c. Engine Load | |
| d. AAT | "AAT"—Ambient Air Temperature |
| e. IFE | "IFE"—Instantaneous Fuel Economy |
| f. EOT | "EOT"—Engine Oil Temperature |
| g. MAP Sensor | "MAP"—Manifold Absolute Pressure |
| h. TBP | "TBP"—Turbo Boost Pressure |
| i. IFC Consumption | "IFC"—Instantaneous Fuel |
| j. Engine Speed | |

TEST 1

DCAI System Not Installed

Condition: Severe Hill Climb and Head Wind
Engine Load: 41.5%
IMT: 95.0 F
TBP: 15.875 lb/in$^2$
ECT: 180.0 F
IFE: 6.1 mpg
Engine Speed: 1404 rpm
AAT: 72 F
EOT: 223 F
IFC: 0.003 gal/s

TEST 2

DCAI System Not Installed

Condition: Hill Climb and Head Wind
Engine Load: 36.0%
IMT: 121.0 F
TBP: 11.875 lb/in$^2$
ECT: 181.0 F
IFE: 6.9 mpg
Engine Speed: 1398 rpm
AAT: 72 F
EOT: 219 F
IFC: 0.003 gal/s

TEST 3

DCAI System Installed

Condition: Head Wind 15-20 mph
Engine Load: 28.0%
IMT: 126.0 F
TBP: 5.625 lb/in$^2$
IFE: 9.4 mpg
Engine Speed: 1227 rpm
AAT: 72 F
EOT: 206 F
IFC: 0.002 gal/s

TEST 4

DCAI System Installed

Condition: Head Wind 15-20 mph
Engine Load: 24.0%
IMT: 113.0 F
TBP: 7.750 lb/in$^2$
ECT: 180.0 F
IFE: 10.2 mpg Engine Speed: 1401 rpm
AAT: 72 F
EOT: 214 F
IFC: 0.002 gal/s

TEST 5

DCAI System Installed

Condition: Head Wind 15-20 mph
Engine Load: 23.0%
IMT: 108.0 F
TBP: 7.125 lb/in$^2$
ECT: 180.0 F
IFE: 10.6 mpg
Engine Speed: 1397 rpm
AAT: 72 F
EOT: 218 F
IFC: 0.002 gal/s

TEST 6

DCAI System Installed

Condition: Hill Climb and Head Wind
Engine Load: 22.0%
IMT: 109.0 F
TBP: 6.625 lb/in$^2$
ECT: 179.0 F
IFE: 10.8 mpg
Engine Speed: 1398 rpm
AAT: 72 F
EOT: 215 F
IFC: 0.002 gal/s

TEST 7

DCAI System Installed

Condition: Climbing Hill
Engine Load: 20.5%
IMT: 118.0 F
TBP: 6.125 lb/in$^2$
ECT: 181.0 F
IFE: 11.8 mpg
Engine Speed: 1399 rpm
AAT: 72 F
EOT: 222 F
IFC: 0.002 gal/s Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. It is therefore, contemplated that the claims will cover any such modifications or embodiments that fall within the true scope of the invention.

What is claimed is:

1. A dual cold air induction system for cooling ingested ambient air prior to introduction to an air cleaner and for further cooling the cooled ingested ambient air prior to introduction to a point of ignition in a diesel engine of a vehicle, the system comprising:
    a diesel engine;
    a dual air cooling unit housing operationally and functionally connected to the diesel engine;
    at least one evaporator cooling device disposed within the dual air cooling unit housing;
    at least one blower fan disposed within the dual air cooling unit housing for forcefully dispersing and distributing ingested ambient air over the at least one evaporator cooling device, throughout the dual air cooling unit and throughout the system;
    at least one cold air channel for transporting cooled ingested ambient air from the dual air cooling unit housing to a location prior to an air cleaner;
    at least one secondary after charged intercooler disposed within the dual air cooling unit housing for further cooling the cooled ingested ambient air;
    at least one primary after charged intercooler channel connected to the at least one secondary after charged intercooler; and
    at least one secondary after charged intercooler channel connected from the at least one secondary after charged intercooler.

2. The system as in claim 1 wherein the dual air cooling unit housing further comprises at least one ambient air ingestion inlet and components for cooling ingested ambient air prior to introduction into the air cleaner and for cooling the cooled ingested ambient air prior to introduction into the diesel engine.

3. The system as in claim 1 wherein the at least one evaporator cooling device cools ingested ambient air to a predetermined temperature and maintains the temperature of the dual air cooling unit housing at the predetermined temperature.

4. The system as in claim 3 wherein the predetermined temperature is preset.

5. The system as in claim 3 further comprising at least one temperature sensor probe in communication with at least one thermostat, wherein the at least one temperature sensor probe and the at least one thermostat cooperatively operate with the at least one evaporator cooling device to maintain the temperature of ingested ambient air within the dual air cooling unit housing at the predetermined temperature.

6. The system as in claim 1 wherein the at least one primary after charged intercooler channel transports cooled ingested ambient air from at least one primary after charged intercooler to the at least one secondary after charged intercooler.

7. The system as in claim 1 wherein the at least one secondary after charged intercooler channel transports cooled ingested ambient air from the at least one secondary after charged intercooler to a point of ignition on the diesel engine.

8. The system as in claim 1 wherein the at least one evaporator cooling device is in flow communication with an evaporator liquid line having a first liquid line tee joint for connection to an original accumulator/dryer and an original evaporator.

9. The system as in claim 8 further comprising a secondary accumulator/dryer which is located along the evaporator liquid line between the first liquid line tee joint and the at least one evaporator cooling device.

10. The system as in claim 8 wherein the evaporator liquid line is in flow communication with an evaporator suction line, wherein the evaporator suction line comprises a first suction line tee joint for connection with the original evaporator and an original air conditioner compressor.

11. The system as in claim 8 wherein a temperature sensor probe is in communication with at least the evaporator liquid line and the at least one evaporator cooling device.

12. The system as in claim 1 further comprising a plenum disposed thereon a portion of the dual air cooling unit housing, wherein the plenum is in communication with the at least one cold air channel.

13. The system as in claim 1 wherein the at least one cold air channel provides for delivery of cooled ingested ambient air from the dual air cooling unit housing to a modified elbow located at the entrance of the air cleaner.

14. The system as in claim 1 further comprising at least one system suction fan disposed within the dual air cooling unit housing for assisting the at least one blower fan and suctioning the ambient air through the at least one evaporator cooling device and the at least one secondary after charged intercooler.

15. The system as in claim 1 wherein the at least one secondary after charged intercooler is a plurality of pipes.

16. A dual cold air induction system for cooling ingested ambient air prior to introduction to an air cleaner and for further cooling the cooled ingested ambient air prior to introduction to a point of ignition in a diesel engine of a vehicle, the system comprising:
- a diesel engine;
- a dual air cooling unit housing comprising a primary cold air induction box and a secondary cold air induction box, wherein the dual air cooling unit housing is operationally and functionally connected to the diesel engine;
- a primary evaporator cooling device disposed within the primary cold air induction box;
- a plurality of primary system blower fans disposed within the primary cold air induction box for forcefully dispersing and distributing ingested ambient air over the primary evaporator cooling device and throughout the system;
- a plurality of primary cold air channels for transporting cooled ingested ambient air from the primary cold air induction box to a location prior to an air cleaner;
- a secondary after charged intercooler disposed within the secondary cold air induction box for further cooling the cooled ingested ambient air;
- a primary after charged intercooler channel connected to the secondary after charged intercooler;
- a secondary evaporator cooling device disposed within the secondary cold air induction box;
- a secondary system blower fan disposed within the secondary cold air induction box for forcefully dispersing and distributing the ambient air over the secondary evaporator cooling device and the secondary after charged intercooler; and
- a secondary after charged intercooler channel connected from the secondary after charged intercooler.

17. The system as in claim 16 wherein the primary cold air induction box comprises a plurality of primary ambient air ingestion inlets and components for cooling ingested ambient air prior to introduction into the air cleaner, and wherein the secondary cold air induction box comprises a secondary ambient air inlet vent and components for cooling the cooled ingested ambient air prior to introduction into the diesel engine.

18. The system as in claim 16 wherein the primary evaporator cooling device cools ingested ambient air to a first predetermined temperature.

19. The system as in claim 18 wherein the secondary evaporator cooling device cools the cooled ingested ambient air to a second predetermined temperature.

20. The system as in claim 19 wherein the first predetermined temperature and the second predetermined temperature are preset.

21. The system as in claim 19 wherein the first predetermined temperature and the second predetermined temperature are substantially the same.

22. The system as in claim 19 further comprising a primary temperature sensor probe in communication with a primary thermostat, wherein the primary temperature sensor probe and the primary thermostat cooperatively operate with the primary evaporator cooling device to maintain the ingested ambient air within the primary cold air induction box at the first predetermined temperature.

23. The system as in claim 22 further comprising a secondary temperature sensor probe in communication with a secondary thermostat, wherein the secondary temperature sensor probe and the secondary thermostat cooperatively operate with the secondary evaporator cooling device to maintain the ingested ambient air within the secondary cold air induction box at the second predetermined temperature.

24. The system as in claim 23 wherein the primary evaporator cooling device is in flow communication with a primary evaporator liquid line having a first liquid line tee joint for connection to an original accumulator/dryer and an original evaporator.

25. The system as in claim 24 wherein the secondary evaporator cooling device is in flow communication with a secondary evaporator liquid line having a second liquid line tee joint for connection to the primary evaporator liquid line.

26. The system as in claim 25 further comprising a secondary accumulator/dryer which is located along the primary evaporator liquid line between the first liquid line tee joint and the second liquid line tee joint.

27. The system as in claim 25 wherein the secondary temperature sensor probe is in communication with the secondary evaporator liquid line and the secondary evaporator cooling device.

28. The system as in claim 24 wherein the primary evaporator liquid line is in flow communication with a primary evaporator suction line, wherein the primary evaporator suction line comprises a first suction line tee joint for connection with the original evaporator and an original air conditioner compressor.

29. The system as in claim 24 wherein the primary temperature sensor probe is in communication with the primary evaporator liquid line and the primary evaporator cooling device.

30. The system as in claim 16 further comprising a plenum disposed thereon a portion of the primary cold air induction box and wherein the plenum is in communication with the plurality of primary cold air channels.

31. The system as in claim 16 wherein the plurality of primary cold air channels provide for delivery of cold air from the primary cold air induction box to a modified elbow located at the entrance of the air cleaner.

32. The system as in claim 16 further comprising a secondary system suction fan disposed within the secondary cold air induction box for assisting the secondary system blower fan and suctioning the ambient air through the secondary evaporator cooling device and the secondary after charged intercooler.

33. The system as in claim 16 wherein the primary after charged intercooler channel transports cooled ingested ambient air from a primary after charged intercooler to the secondary after charged intercooler.

34. The system as in claim 16 wherein the secondary after charged intercooler channel transports cooled ingested ambient air from the secondary after charged intercooler to a point of ignition on the diesel engine.

35. The system as in claim 16 wherein the secondary after charged intercooler is a plurality of pipes.

36. A dual cold air induction system for cooling ingested ambient air prior to introduction to an air cleaner and for further cooling the cooled ingested ambient air prior to introduction to a point of ignition in a diesel engine of a vehicle, the system comprising:
- a diesel engine;
- a modified elbow in communication with an inlet of an air cleaner
- a dual air cooling unit housing, operationally and functionally connected to the diesel engine, comprising a primary cold air induction box and a secondary cold air induction box, wherein the primary cold air induction box comprises a plurality of primary ambient air ingestion inlets and components for cooling the ingested ambient air prior to introduction into the air cleaner, and wherein the secondary cold air induction box comprises a secondary ambient air inlet vent and components for cooling the cooled ingested ambient air prior to introduction into the diesel engine;
- a primary evaporator cooling device disposed within the primary cold air induction box for cooling the ingested ambient air to a predetermined temperature;
- a primary temperature sensor probe in communication with a primary thermostat, wherein the primary temperature sensor probe and the primary thermostat cooperatively operate with the primary evaporator cooling device to maintain the ingested ambient air within the primary cold air induction box at the predetermined temperature;
- a plurality of primary system blower fans disposed within the primary cold air induction box for forcefully dispersing and distributing the ingested ambient air over the primary evaporator cooling device, the primary temperature sensor probe and throughout the system;
- a plenum disposed thereon a portion of the housing of the primary cold air induction box;
- a plurality of primary cold air channels for transporting the cooled ingested ambient air from the plenum to the modified elbow;
- a secondary after charged intercooler disposed within the secondary cold air induction box for further cooling the cooled ingested ambient air from a primary after charged intercooler, prior to introduction into a point of ignition on the diesel engine;
- a primary after charged intercooler channel for transporting the cooled ingested ambient air from the primary after charged intercooler to the secondary after charged intercooler;
- a secondary evaporator cooling device disposed within the secondary cold air induction box for cooling the ambient air to the predetermined temperature;
- a secondary temperature sensor probe in communication with the primary thermostat, wherein the secondary temperature sensor probe and the primary thermostat cooperatively operate with the secondary evaporator cooling device to maintain the ambient air within the secondary cold air induction box at the predetermined temperature
- a secondary system blower fan disposed within the secondary cold air induction box for forcefully dispersing and distributing the ambient air over the secondary evaporator cooling device, the secondary temperature sensor probe and the secondary after charged intercooler;
- a secondary system suction fan disposed within the secondary cold air induction box for assisting the secondary system blower fan and suctioning the ambient air through the secondary evaporator cooling device, the secondary temperature sensor probe and the secondary after charged intercooler; and
- a secondary after charged intercooler channel for transporting the further cooled ingested ambient air from the secondary after charged intercooler to the point of ignition on the diesel engine.

37. The system as in claim 36 wherein the secondary after charged intercooler is a plurality of pipes.

38. A dual cold air induction apparatus for cooling ingested ambient air prior to introduction to an air cleaner and for further cooling the cooled ingested ambient air prior to introduction to a point of ignition in a diesel engine of a vehicle, the apparatus comprising:
- a dual air cooling unit housing;
- a plurality of air ports located on the dual air cooling unit housing, wherein a plurality of channels are removably attached thereto at the plurality of air ports;
- at least one evaporator cooling device disposed within the dual air cooling unit housing;
- at least one blower fan disposed within the dual air cooling unit housing for forcefully dispersing and distributing the ingested ambient air; and
- at least one secondary after charged intercooler disposed within the dual air cooling unit housing.

39. The apparatus as in claim 38 wherein the dual air cooling unit housing is constructed of steel.

40. The apparatus as in claim 38 wherein the dual air cooling unit housing is constructed of plastic.

41. The apparatus as in claim 38 wherein the dual air cooling unit housing is fully covered on the exterior with an insulative material.

42. The apparatus as in claim 38 further comprising a plenum disposed thereon a portion of the dual air cooling unit housing, wherein at least one of the plurality of air ports is in air flow communication with the plenum.

43. The apparatus as in claim 38 further comprising a system suction fan for assisting the at least one blower fan and suctioning the ambient air through the at least one evaporator cooling device and the at least one secondary after charged intercooler and is disposed within the dual air cooling unit housing in front of the at least one secondary after charged intercooler.

44. The apparatus as in claim 38 wherein the dual air cooling unit housing further comprises at least one ambient air ingestion inlet and components for cooling ingested ambient air prior to introduction into an air cleaner and for cooling the ingested ambient air prior to introduction into a diesel engine.

45. The apparatus as in claim 38 wherein at least one of the plurality of air ports is in air flow communication with the at least one evaporator.

46. The apparatus as in claim 38 wherein the at least one blower fan disperses and distributes the ingested ambient air over the at least one evaporator cooling device, throughout the dual air cooling unit housing and throughout a dual cold air induction system.

47. The apparatus as in claim 38 wherein at least two of the plurality of air ports are in air flow communication with the at least one secondary after charged intercooler.

48. The apparatus as in claim 38 further comprising a temperature sensor probe in communication with a thermostat, wherein the temperature sensor probe and the thermostat cooperatively operate with the at least one evaporator cooling device to maintain the ingested ambient air within the dual air cooling unit housing at a predetermined temperature.

49. The apparatus as in claim 48 wherein the predetermined temperature is preset.

50. The apparatus as in claim 48 wherein the at least one evaporator cooling device is in flow communication with an evaporator liquid line.

51. The apparatus as in claim 50 wherein the evaporator liquid line is in flow communication with an evaporator suction line.

52. The apparatus as in claim 51 wherein the temperature sensor probe and the thermostat are in communication with the evaporator liquid line and the at least one evaporator cooling device.

53. The apparatus as in claim 52 further comprising a secondary accumulator/dryer which is located along the evaporator liquid line.

54. The apparatus as in claim 38 wherein the at least one secondary after charged intercooler is a plurality of pipes.

55. A dual cold air induction apparatus for cooling ingested ambient air prior to introduction to an air cleaner and for further cooling the cooled ingested ambient air prior to introduction to a point of ignition in a diesel engine of a vehicle, the apparatus comprising:
- a dual air cooling unit housing comprising a primary cold air induction box and a secondary cold air induction box;
- a plurality of air ports dispersed on the dual air cooling unit housing;
- a primary evaporator cooling device disposed within the primary cold air induction box;
- a plurality of primary system blower fans disposed within the primary cold air induction box for forcefully dispersing and distributing the ingested ambient air throughout a dual cold air induction system;
- a secondary after charged intercooler disposed within the secondary cold air induction box;
- a secondary evaporator cooling device disposed within the secondary cold air induction box; and
- a secondary system blower fan device for forcefully dispersing and distributing the ambient air over the secondary evaporator cooling device and the secondary after charged intercooler and is disposed within the secondary cold air induction box.

56. The apparatus as in claim 55 wherein the dual air cooling unit housing is constructed of steel.

57. The apparatus as in claim 55 wherein the dual air cooling unit housing is constructed of plastic.

58. The apparatus as in claim 55 wherein the dual air cooling unit housing is fully covered on the exterior with an insulative material.

59. The apparatus as in claim 55 wherein the primary cold air induction box comprises a plurality of primary ambient air ingestion inlets and components for cooling ingested ambient air prior to introduction into an air cleaner, and wherein the secondary cold air induction box comprises a secondary ambient air inlet vent and components for cooling the cooled ingested ambient air prior to introduction into a diesel engine.

60. The apparatus as in claim 55 wherein a plurality of channels are removably attached to the plurality of air ports.

61. The apparatus as in claim 55 wherein at least one of the plurality of air ports is in air flow communication with the primary evaporator cooling device.

62. The apparatus as in claim 55 wherein a portion of the plurality of air ports is in air flow communication with the secondary after charged intercooler.

63. The apparatus as in claim 55 wherein the secondary evaporator cooling device is located behind the secondary after charged intercooler.

64. The apparatus as in claim 55 wherein the secondary system blower fan device is located behind the secondary evaporator cooling device.

65. The apparatus as in claim 55 further comprising a primary temperature sensor probe in communication with a primary thermostat, wherein the primary temperature sensor probe and the primary thermostat cooperatively operate with the primary evaporator cooling device to maintain the ingested ambient air within the primary cold air induction box at a first predetermined temperature.

66. The apparatus as in claim 65 wherein the first predetermined temperature is preset.

67. The apparatus as in claim 65 further comprising a secondary temperature sensor probe in communication with a secondary thermostat, wherein the secondary temperature sensor probe and the secondary thermostat cooperatively operate with the secondary evaporator cooling device to maintain the ingested ambient air within the secondary cold air induction box at a second predetermined temperature.

68. The apparatus as in claim 67 wherein the second predetermined temperature is preset.

69. The apparatus as in claim 67 wherein the first predetermined temperature and the second predetermined temperature are substantially the same.

70. The apparatus as in claim 67 wherein the primary evaporator cooling device is in flow communication with a primary evaporator liquid line.

71. The apparatus as in claim 70 wherein the secondary evaporator cooling device is in flow communication with a secondary evaporator liquid line, wherein the secondary evaporator liquid line branches from the primary evaporator liquid line at a first liquid line tee joint.

72. The apparatus as in claim 71 further comprising a secondary accumulator/dryer which is located along the primary evaporator liquid line prior to the first liquid line tee joint.

73. The apparatus as in claim 71 wherein the secondary evaporator liquid line is in flow communication with a secondary evaporator suction line.

74. The apparatus as in claim 73 wherein the primary evaporator liquid line is in flow communication with a primary evaporator suction line.

75. The apparatus as in claim 55 further comprising a plenum disposed thereon a portion of the primary cold air induction box, wherein at least one of the plurality of air ports is in air flow communication with the plenum which is in air flow communication with the primary evaporator cooling device.

76. The apparatus as in claim 55 further comprising a secondary system suction fan for assisting the secondary system blower fan device and suctioning the ambient air through the secondary evaporator cooling device and the secondary after charged intercooler and is disposed within the secondary cold air induction box.

77. The apparatus as in claim 76 wherein the secondary system suction fan is located in front of the secondary after charged intercooler.

78. The apparatus as in claim 55 wherein the secondary after charged intercooler is a plurality of pipes.

79. A dual cold air induction apparatus for cooling ingested ambient air prior to introduction to an air cleaner and for further cooling the cooled ingested ambient air prior to introduction to a point of ignition in a diesel engine of a vehicle, the apparatus comprising:

a dual air cooling unit housing comprising a primary cold air induction box and a secondary cold air induction box, wherein the primary cold air induction box comprises a plurality of primary ambient air ingestion inlets and components for cooling the ingested ambient air prior to introduction into an air cleaner, and wherein the secondary cold air induction box comprises a secondary ambient air inlet and components for cooling the cooled ingested ambient air prior to introduction into the diesel engine;

a plurality of air ports, wherein a plurality of channels are removably attached thereto at the plurality of air ports;

a plenum disposed thereon a portion of the housing of the primary cold air induction box, wherein a portion of the plurality of air ports are in air flow communication with the plenum;

a primary evaporator cooling device disposed within the primary cold air induction box, wherein the plenum is in air flow communication with the primary evaporator cooling device;

a primary temperature sensor probe in communication with a primary thermostat, wherein the primary temperature sensor probe and the primary thermostat cooperatively operate with the primary evaporator cooling device to maintain the ingested ambient air within the primary cold air induction box at a predetermined temperature;

a plurality of primary system blower fans disposed within the primary cold air induction box for forcefully dispersing and distributing the ingested ambient air throughout a dual cold air induction system;

a secondary after charged intercooler disposed within the secondary cold air induction box, wherein a potion of the plurality of air ports are in air flow communication with the secondary after charged intercooler;

a secondary evaporator cooling device for cooling the ambient air to the predetermined temperature and is disposed within the secondary cold air induction box behind the secondary after charged intercooler;

a secondary temperature sensor probe in communication with the primary thermostat, wherein the secondary temperature sensor probe and the primary thermostat cooperatively operate with the secondary evaporator cooling device to maintain the ambient air within the secondary cold air induction box at the predetermined temperature;

a secondary system blower fan device for forcefully dispersing and distributing the ambient air over the secondary evaporator cooling device, the secondary temperature sensor probe and the secondary after charged intercooler and is disposed within the secondary cold air induction box behind the secondary evaporator cooling device;

a secondary system suction fan for assisting the secondary system blower fan device and suctioning the ambient air through the secondary evaporator cooling device, the secondary temperature sensor probe and the secondary after charged intercooler and is disposed within the secondary cold air induction box in front of the secondary after charged intercooler; and a secondary ambient air outlet vent disposed on a portion of the housing of the secondary cold air induction box.

80. The apparatus as in claim 79 wherein the secondary after charged intercooler is a plurality of pipes.

81. A method for providing cold air into a point of ignition of a diesel engine, the method comprising the steps of:

cooling ingested ambient air prior to introduction to an air cleaner; and further cooling the pressurized cooled ingested ambient air subsequent a primary after charged intercooler and prior to delivery of the pressurized cooled ingested ambient air to an engine intake.

82. A method for providing cold air into a point of ignition of a diesel engine, the method comprising the steps of:

providing a diesel engine having an engine intake;

providing and utilizing an originally installed air cleaner, an original air conditioning compressor, an original air conditioning condenser and an original accumulator/dryer of a vehicle;

providing a dual air cooling unit housing comprising a primary cold air induction box and a secondary cold air induction box;

ingesting ambient air into the primary cold air induction box through a plurality of ambient air ingestion inlets located on the dual air cooling unit housing for cooling thereof;

providing a primary evaporator cooling device in the primary cold air induction box;

cooling the ingested ambient air in the primary cold air induction box to a first predetermined temperature by way of the primary evaporator cooling device;

distributing the cooled ingested ambient air forcefully by way of a primary blower fan within the primary cold air induction box to a location prior to the air cleaner;

ingesting ambient air into the secondary cold air induction box through a secondary ambient air inlet for cooling thereof;

providing a secondary evaporator cooling device in the secondary cold air induction box;

cooling the ingested ambient air in the secondary cold air induction box to a second predetermined temperature by way of the secondary evaporator cooling device;

providing a secondary after charged intercooler in the secondary cold air induction box;

distributing the cooled ingested ambient air forcefully by way of a secondary blower fan within the secondary cold air induction box through the secondary after charged intercooler for further cooling the compressed ambient air; and delivering the cooled compressed ambient air into the engine intake of the diesel engine.

83. The method as in claim 82 further providing a plenum located in the primary cold air induction box after the primary evaporator cooling device.

84. The method as in claim 82 further providing a secondary system suction fan in the secondary cold air induction box.

85. The method as in claim 82 wherein the first predetermined temperature and the second predetermined temperature are substantially the same.

86. The method as in claim 82 wherein the secondary after charged intercooler is a plurality of pipes.

* * * * *